United States Patent

Booe

[15] 3,649,892
[45] Mar. 14, 1972

[54] CAPACITORS UTILIZING BONDED DISCRETE POLYMERIC FILM DIELECTRICS

[72] Inventor: James M. Booe, Indianapolis, Ind.
[73] Assignee: P. R. Mallory & Co., Inc., Indianapolis, Ind.
[22] Filed: July 13, 1970
[21] Appl. No.: 54,187

[52] U.S. Cl................................317/258, 317/260, 317/261
[51] Int. Cl............................................................H01g 1/01
[58] Field of Search................317/261, 260, 258; 174/110 R, 174/72 B

[56] References Cited

UNITED STATES PATENTS

| | | |
|---|---|---|
| 2,014,398 | 9/1935 | Sprague...................................317/261 |
| 2,930,714 | 3/1960 | Netherwood........................317/260 X |
| 3,026,457 | 3/1962 | Ruscito...................................317/260 |
| 3,048,750 | 8/1962 | Netherwood........................317/260 X |
| 3,049,651 | 8/1962 | Adelson..................................317/260 |
| 3,179,634 | 8/1965 | Edwards..............................174/110 R |
| 3,400,303 | 9/1968 | Rowlands..............................174/72 B |

Primary Examiner—E. A. Goldberg
Attorney—Richard H. Childress, Robert F. Meyer and Henry W. Cummings

[57] ABSTRACT

Capacitors employing discrete polymeric film dielectrics adhesively bonded to metal foil electrodes have been found to be effective up to and including high-voltage applications of either AC or DC.

19 Claims, 7 Drawing Figures

PATENTED MAR 14 1972 3,649,892
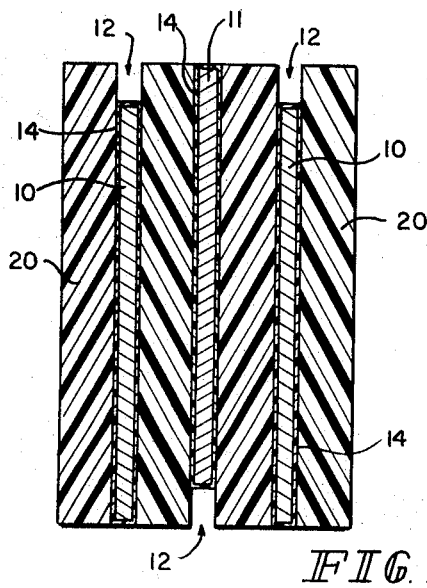
FIG. 1
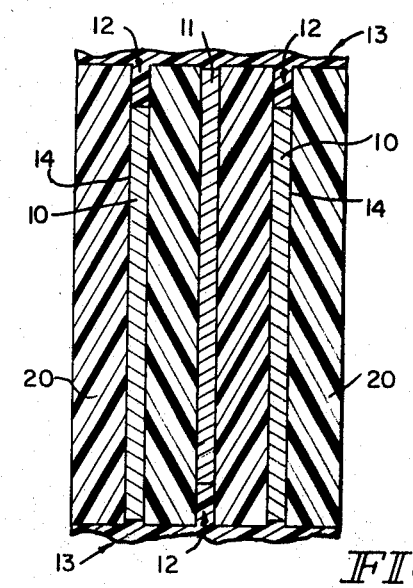
FIG. 2
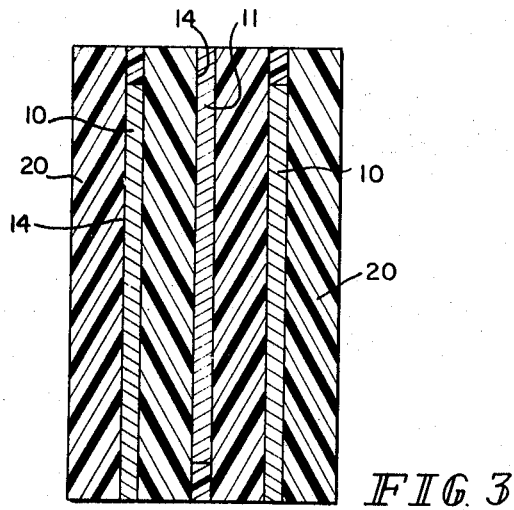
FIG. 3
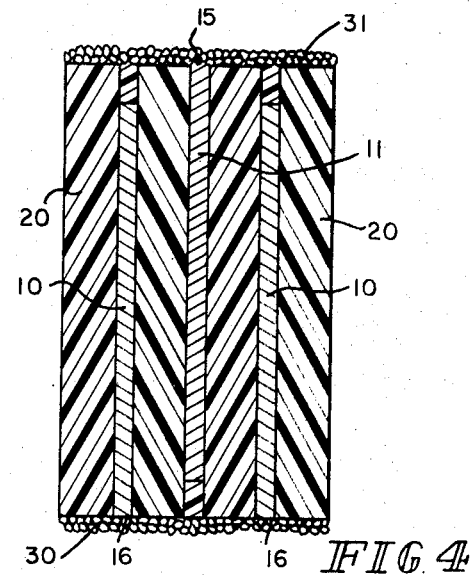
FIG. 4
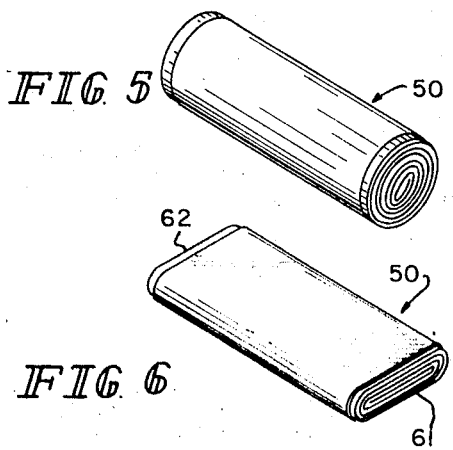
FIG. 5
FIG. 6
FIG. 7
INVENTOR
JAMES M. BOOE
BY Henry W. Cummings
ATTORNEY

CAPACITORS UTILIZING BONDED DISCRETE POLYMERIC FILM DIELECTRICS

BACKGROUND

High voltage capacitors of the prior art employ a liquid dielectric such as an oil with paper or paper and film between the electrode foils. Aside from the recognized problems with the liquid they generally require increased electrode spacing to withstand a given potential and some types can not be used for extended periods of DC applications.

Known state of the art capacitors having discrete polymeric film dielectrics for high voltage applications have shortcomings with respect to arcing or corona discharge between the electrodes either internally or at the electrode edges or both. There are also problems with lead attachment, inductance, limited environmental characteristics, etc.

Polymeric film dielectric capacitors of the prior art have somewhat of an open structure, having some air space between the dielectric film and the foil electrodes. Also, void areas at the ends of the windings provide air paths between the electrode edges where corona or arc discharge can occur. Furthermore, these capacitors lack rigidity and strength of lead attachment to the foil electrodes.

OBJECTS

It is an object of the present invention to provide film-type capacitors and a method of making the same which have increased breakdown voltage.

It is another object of the present invention to provide capacitors and a method of making the same which reduces or eliminates arcing and corona discharge.

It is another object of the present invention to provide capacitors and a method of making the same which reduces the size of the device for a given rating.

It is another object of the present invention to provide capacitors and a method of making the same which will withstand high operating temperatures.

It is another object of the present invention to provide capacitors and a method of making the same which can operate on AC or DC.

Still another object is to provide a film dielectric capacitor having a high degree of rigidity.

Another object is to provide a film type capacitor having strong lead attachment to the foil electrodes.

Another object is to provide a film capacitor capable of withstanding high shock and vibration.

Yet another object is to provide a wound film type capacitor having practically low inductance.

Another object is to provide a parallel plate or stacked assembly of foil electrodes and polymeric film dielectrics which retains its structure over a broad temperature range without the aid of an external retaining force or auxiliary structure.

Still another object is to provide a capacitor made of foil and polymeric film capable of operating up to 3,000 to 5,000 volts per mil of electrode spacing without the use of an external protective environment.

Other objects will be apparent from the following description and drawings.

The capacitor construction of this invention makes improved use of certain polymeric dielectric films, including the newer high dielectric strength films, by enabling them to function nearer their intrinsic voltage capability. This is accomplished by the use of selected polymeric bonding agents within and about the structure to bond the electrode foils to the dielectric film. Not only does this technique provide a highly rigid structure but mainly it provides for the virtually complete exclusion of voids between the foil and film, and it fills in all voids areas about the outer extremities of the capacitor particularly between the edges of the extending dielectric films. This covers over the inset edges of the foil electrodes thus providing several times higher insulation against corona and arcing at this point than that provided by air in conventional film capacitor constructions. Additionally, the electrode edges not inset terminate and are exposed at the surface of the structure to which termination is made by a proprietary method as described in application Ser. No. 13,688, filed Feb. 24, 1970. Furthermore, it has been found that by the proper selection of bonding materials and methods of use the residual bonding agent remaining between the electrode foil and dielectric film does not contribute appreciably to reducing the capacitance.

This concept is particularly indicated for very small to moderate size devices especially where higher voltages of operation are required. Among other applications would include high energy storage, laser, missile, night vision, commutating and television circuitry.

In the drawings, FIGS. 1-4 are sectional views illustrating various stages of preparation of the capacitors of the present invention.

In FIG. 1 offset positioned metal foils 10 and 11 are shown. Assembled thereto in a manner to be hereinafter described is at least one polymeric film 20. Because of offset positioning of foils void spaces 12 occur near the edge. At least one adhesive binder 14 is applied so as to substantially fill void spaces 12 as described in greater detail hereinafter. Next the assembly is pressed, FIG. 2, preferably at elevated temperature. This decreases the thickness of polymeric adhesive layers 14 and forces the excess material 14 into voids 12 and to the outer extremities at 13. The surplus solidified binder 13 is removed as shown in FIG. 3. As shown in FIG. 4, the edges 16 of foils 10 and the edges 15 of foils 11 respectively are electrically connected together by applying terminating coatings 30 and 31, of metallic material, for example by spraying a nickel-aluminum composition as described in application Ser. No. 13,688, filed Feb. 24, 1970, assigned to the same assignee as the present application which is hereby incorporated into the present application by reference. Leads may then be applied to 30 and 31 to connect the capacitors into an electrical circuit. If desired for some applications the capacitors may be encapsulated in a known manner, preferably with a protective polymeric coating before or after attachment of leads.

FIG. 5 shows a wound construction of foil and film 50 having incorporated therein an adhesive bonding agent (not shown) by methods described hereinafter. FIG. 6 shows the same construction after pressing, preferably at elevated temperature to cure and solidify the bonding agent, with the surplus material trimmed off at 61 and 62. FIG. 7 shows the same construction after applying the electrical terminating coatings 30 and 31 as referred to hereinbefore.

In general, by the term "film materials" is meant a flat section of polymeric material which is thin in relation to the length and breadth and which generally has a nominal thickness or gauge of not greater than about 0.010 inches (10 mils). Such films may be used with at least one polymeric bonding agents to bond same to the electrodes.

A wide variety of polymeric materials may be utilized to produce these films. These polymeric films may be selected from among the following. One family of materials which is particularly suited to film production is olefin polymers. Included in this term are polymers which polymerize off the basic double bond monomer illustrated below.

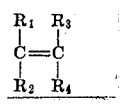

where $R_1$, $R_2$, $R_3$ and $R_4$ may be hydrogen or a wide variety of radicals described below.

These polymers are readily obtained, as is well known, by polymerizing the unsaturated monomers via free-radical, cationic, anionic or organometallic coordination catalysts leading to atactic, isotactic or syndiotactic polymers or mixtures thereof; or other stereoregular polymers, such as the cis to trans isomers of, e.g., poly(butadiene). It is possible to make block or graft polymers also, according to well-known methods, which have varying properties. It is also possible, as is well known, to cross-link many of these materials, e.g., polybutadienes giving a thermoset product.

Representative examples are the homologous series of poly(ethylene), poly(propylene), ..., (poly(1-octene), etc.; structural isomers such as poly(isobutene) and poly(butene-1); and a wide variety of copolymers thereof. Other examples are the vinyl, vinylidene, vinylene, acrylic, methacrylic, and cyanoacrylic series (see below) and copolymers thereof.

Thus if $R_1$, $R_2$ and $R_3$ are hydrogen $R_4$ may be any of the groups

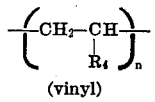

(vinyl)

known to those skilled in the arts; e.g.—H; alkyl, aryl, alkaryl, aralkyl and substituted alkyl, aryl, alkaryl, aralkyl groups; halides, hydroxyl; ether groups; carboxyl; ester groups; cyano; heterocyclic groups; etc.

If $R_1$ and $R_2$ are hydrogen for example $R_3$ and $R_4 = -CH_2CH_3$, $-C_6H_5$,

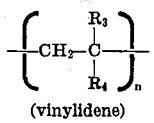

(vinylidene)

$-CH_2C_6H_5$, $-C_6H_5CH_3$, $-Cl$, $-OH$, $-OCH_3$, $-COOH$, $-COOCH_3$,

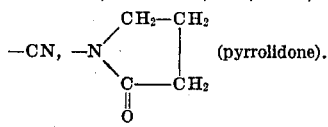

In the case of vinylidene monomers, some of the above R groups will not serve as well as others due to steric hindrance and/or electronic considerations.

Some examples of the subgroups within the acrylic "family" are:

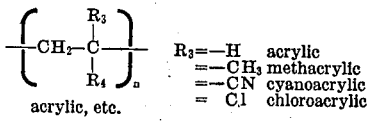

Others are possible as is well known to those skilled in the art. $R_3$ e.g., may be $-COOR'$; $-CONR'_2$ where $-R'$ is $-H$; alkyl, aryl, alkaryl, aralkyl or substituted alkyl, alkaryl, aralkyl and aryl groups.

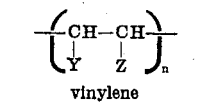

vinylene

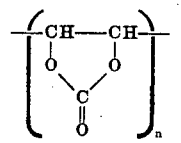

poly(vinylene carbonate)

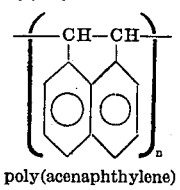

poly(acenaphthylene)

Vinylene monomers differ structurally from the vinylidene in that the two substituents are attached to adjacent carbon atoms rather than the same carbon atom. Substituent Y may be the same or different than Z. Some examples of suitable groups were given above as $R_3$. Again, not all groups will permit polymerization, as is well known to those skilled in the art. Also, the Y and Z groups may represent one substituent as is shown for vinylene carbonate and acenaphthylene.

Also a wide variety of copolymers of the above may be prepared.

Also $R_1$ and/or $R_2$ and/or $R_3$ and/or $R_4$ may be aromatic.

Excellent dielectric properties are derived from aromatic groups attached to the carbon chain: for example polymers and copolymers of styrene; styrene derivatives such as vinyl-toluene, alphamethylstyrene, mono-, di- or poly-alkyl or -aryl styrenes, chlorostyrenes, dichlorostyrenes, and other halo-substituted styrenes, cyanostyrenes, nitrostyrenes, and the like; vinylbiphenyls; vinylnaphthalenes, vinylterphenyls; vinylfluorenes; 9-methylenefluorene; vinylphenanthranes; vinylpyrenes; vinyldibenzofuranes; vinylcarbazoles; vinylphenoxathiins; and the wide variety of other similar monomers well known to those skilled in the art. Still other examples are polymers and copolymers of butadiene, isoprene, chloroprene, 4-methylpentene-1, and the like; tetrafluoroethylene, vinylidene fluoride, hexafluoropropylene, and the like, modified polymers such as polyvinylformal, acetal, -butyral, and the like; as well as the so-called "spontaneous free radicals" polymers of poly(paraxylylene), its derivatives and the like. Of these polymers included in the double bond polymerization unorientated, polystyrene, halogenated monomers such as polyvinyl chloride, polyvinyl fluoride, combination polymers such as vinyl chloride, vinyl acetate, polyvinyladine chloride, polyvinyl acetate, polyvinyl alcohol are preferred.

A second group of polymeric materials from which films may be prepared is condensation polymers. Condensation polymers are prepared by well known techniques, and include polyesters; polyamides; polyester-amides, polyurethanes; polycarbonates; condensations of formaldehyde with phenol, resorcinol, melamine, urea, and the like; phenoxy resins, polyphenylene, polyphenyleneoxide; polyphenylenesulfide; polydiphenyleneoxide; polysulfones and copolymers thereof, and the like; and copolymers with each of the above with each other. Some examples are depicted below.

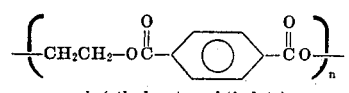

poly(ethyleneterephthalate)

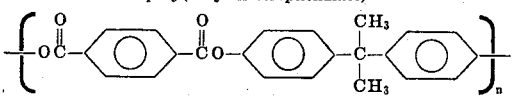

an aromatic polyester

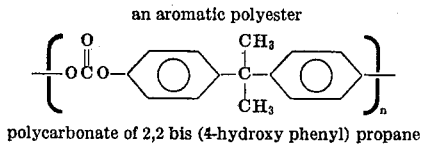

polycarbonate of 2,2 bis (4-hydroxy phenyl) propane
(Polycarbonate I)

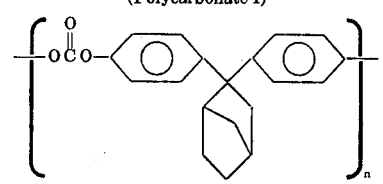

polycarbonate of 2,2 bis (4-hydroxy phenyl) norbornane
(Polycarbonate II)

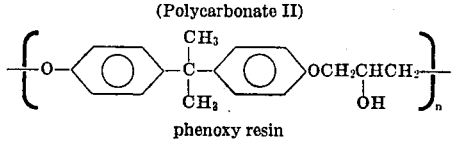

phenoxy resin

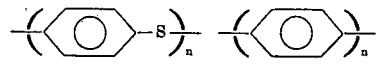

poly(phenylenesulfide) poly (phenyl)

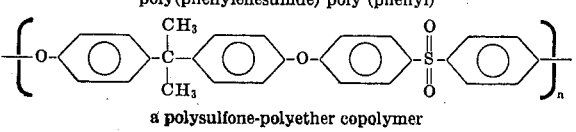

a polysulfone-polyether copolymer

Esters are formed by the action of polybasic acids or their anhydrides with polyhydric alcohols. The polyesters may be utilized in either the orientated or nonorientated form, it is preferred if they are orientated. One particularly advantageous type of polyesters is the cellulose esters, exemplary materials in this category include cellulose, cellulose acetate, cellulose acetate-buterate, ethyl cellulose, methyl cellulose, cellophane with or without a polymer coating, cellulose alone has the formula [(C₆H₇O₂)OH₃](n). Additionally, cellulose ethers may be formed. They generally have the formula [(C₆H₄)"₂ O-C-O-R)₃]ₙ where R is methyl, ethyl, benzyl or other desired radicals.

Cellulosic polymers should be recommended with discretion. They have high dielectric constants but, in general, high dissipation factors and limited temperature capabilities, depending upon substituents. Some of the commercially available derivatives of value, when used within their limitations are: the cellulose esters, such as -acetate and -buterate; cellulose ethers, such as methyl- and ethyl-cellulose; hydroxyethyl-, and carboxymethyl-cellulose.

Another type of condensation polymer which may be used is polycarbonate. Polycarbonates are esters of diphenylolpropane. Both cast and extruded polycarbonates films may be used. Detailed information regarding particular polycarbonates and their methods of preparation may be obtained from the book *Chemistry and Physics of Polycarbonates* by H. Schnell (1964 John Wiley & Sons Inc.) which is hereby incorporated into the present application specification by reference.

Additional condensation polymers which may be used are the polyamides. Polyamides have the characteristic structure CONH among hydrocarbon residues (CH₂)n. This includes the two main types, polyamides obtained by condensation of diamines with dicarboxic acids and polyamides obtained by condensation of amino acids. Exemplary film materials include the resins of the first type nylons —OC(CH₂)n CONH(CH₂)m NHCO(CH₂)n CONH(CH₂)m NH— n and m are integers, usually not above 10.

Another condensation polymer is polyurethane, which is formed according to the reaction, of diisocyanate with two or more hydroxyl groups. OH—R—OCONH—R'—NHCOO—R—OCONH—R'—NHCOO.

Many of the newer polymers, available commercially or on a developmental scale, possess heterocyclic linkages in the chain. Most of these have excellent electrical properties and extremely high temperature capabilities. One type is a polyimide. It is characterized by the presence of the grouping.

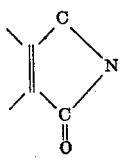

It can be supplied as a polyamic resin solution, which upon removal of solvent and heating converts to a polyimide by the elimination of water. This is shown below as a preparation from pyromellitic dianhydride and bis(4-aminophenyl) ether, with subsequent conversion to a polyimide.

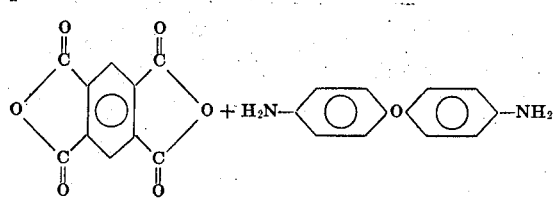

PMDA      BAPE

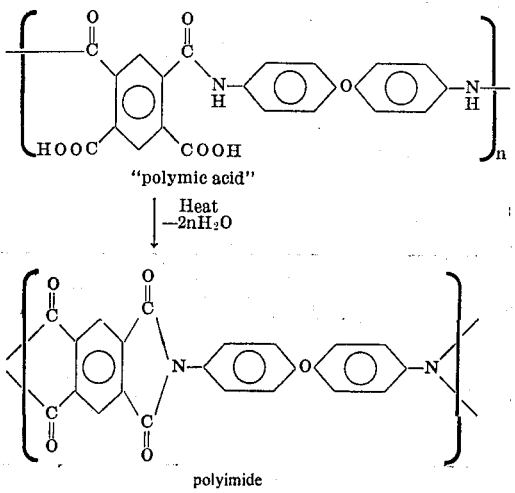

"polymic acid"

Heat —2nH₂O polyimide

A wide variety of properties can be obtained by varying the dianhydride, the diamine, or the processing conditions.

Other properties can be obtained by selecting somewhat similar polymers, such as polyamide-imides and polyester-imides. Here too, properties will vary widely depending upon the amine and anhydride employed. Representative examples are given below

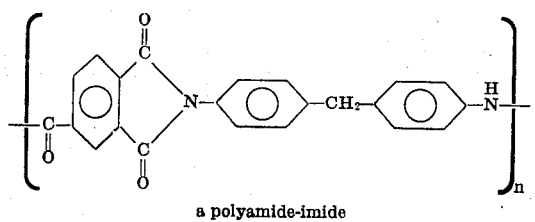

a polyamide-imide

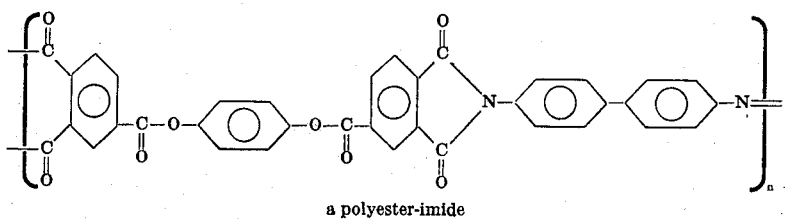

a polyester-imide

In this application, n, m, and p designate that the polymer chain is of indefinite length, containing the units parenthesized. However, the values of n, m, and p in the formulas are generally at least about 100 more preferred at least about 1,000, still more preferred at least about 5,000 and most preferred at least about 10,000. The usable values will vary considerably between different types of polymers. In general n, m, and p should not be so high as to cause processing difficulties, nor so low as to result in structural weakness. Moreover, the values for resinous materials such as certain of the polysiloxanes and epoxy resins may be considerably lower than 100, as is well known to those skilled in the arts.

Heterocyclic rings other than imide are incorporated into polymers, again usually to give high temperature resistance and good electrical properties. Examples are the polyimidazoles, polythiazoles, polyoxazoles, polyoxadiazoles, polythiadiazoles, polytriazoles, polytetraazopyrenes, polyquinoxalines, polyimidazopyrrolones and the like, including polymer chains containing two or more of the above linkages.

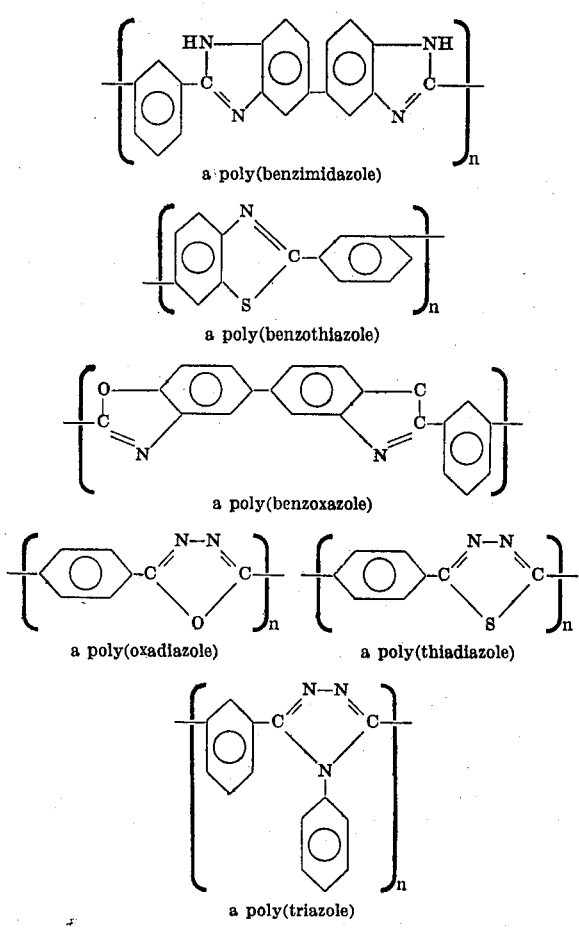

a poly(benzimidazole)

a poly(benzothiazole)

a poly(benzoxazole)

a poly(oxadiazole)   a poly(thiadiazole)

a poly(triazole)

It should be pointed out that additional information regarding polymeric film materials can be found in Kirk-Othmer *Encyclopedia of Chemical Technology* 2nd Ed. Vol. 9, 1966 pp. 221–224 and references cited therein. Additional information on the polymers per se, their structure, properties, methods of preparing etc., may be found in Mayofis *Plastics Insulating Materials*, Iliffe Books, Ltd., London, D. Van Nostrand Co. Inc. Princeton, N.J., 1966. Both of these references are hereby incorporated into the present application by reference.

It should be noted at this point that all the above polymers may not be suitable for all dielectric film uses, but each is suitable within its limitations. For example, if one wants a high dielectric constant, many of the acrylic and cyanoacrylic polymers will be usable, but many of the same will give a high loss factor, so the application must permit of this. If the device is to be used near room temperature and lower, all the above will prove satisfactory, but obviously one would not use polyethylene, for example, in a capacitor required for use at 150° C. Many of the aromatic polymers discussed above will give the lowest loss factors (DF<0.001) and some offer high temperature resistances, but they have low dielectric constants. Thus, the use of any polymer must be matched with its intended application.

In accordance with the present invention certain polymeric film materials have been found to be appliable in producing high-voltage film capacitors either in a stacked or wound configuration.

Polypyromellitimide (polyimide) (PI) film, and polyethylene terephthalate (PETH) have been found to be highly useful for certain applications. Polyethylene terephthalate does not have the high-temperature properties as the polyimide but it does have dielectric strength equal to or slightly greater than the polyimide. Also this is a much lower cost dielectric. However, at the high temperatures such as 150°–200° C. the dielectric strength is less than polyimide. The following data on electrical properties for both these dielectric materials are listed below for comparative purposes.

(polyethylene terephthalate)
Dielectric Constant vs. Temperature (60 Hz.)
  3.16 at 25° C., 3.7 at 150° C.
Dielectric Constant vs. Frequency (25° C.)
  3.12 at 1 kHz., 2.98 at 1 MHz.
Dissipation Factor vs. Temperature (60 Hz.)
  0.0021 at 25° C., 0.0064 at 150° C.
Dissipation Factor vs. Frequency (25° C.)
  0.0047 at 1 kHz., 0.016 at 1 MHz.
Dielectric Strength vs. Temperature (60 Hz.)
  (AC volts per mil on 0.001 inch film)
  7,000 at 25° C., 5,500 at 150° C.
Volume Resistivity vs. Temperature
  $1\times10^{18}$ at 25° C., $1\times10^{13}$ at 150° C. ohm cm.
Insulation Resistance vs. Temperature
  $10^5$ megohms × uF at 75° C. (0.001 inch film)
  800–1,000 megohms × uF at 130° C.
  80–100 megohms × uF at 150° C.

(polyimide)
Dielectric Constant vs. Temperature (100 Hz.)
  3.5 at 25° C., 3.1 at 50° C., 3.0 at 150° C.
Dielectric Constant vs. Frequency 100–100,0000 Hz.
  practically no change
Dissipation Factor vs. Temperature (100 Hz.)
  0.002 at R.T., same at 150° C., 0.0045 at 220° C.
Dissipation Factor vs. Frequency (25° C.)
  0.002 at 100 Hz., 0.008 at $10^5$ Hz.
Dielectric Strength vs. Temperature (0.001 inch film)
  7,000 VAC at 25° C., 6,000 VAC at 150° C.
Volume Resistivity vs. Temperature
  $1\times10^{19}$ ohm cm at 25° C., $1\times10^{15}+$ at 150° C.
Insulation Resistance vs. Temperature
  $1\times10^6$ megohms × uF at 75° C.
  $1\times10^4$ megohms × uF at 125° C.
  $1\times10^3$ megohms × uF at 150° C.

Since the dielectric constant curve for polyimide film is rather uniform from about 60° C. to 220° C. this makes for good capacitance maintenance in this temperature range, however, in going from 60° C. to about 20° C. the K rises from about 3.05 to about 3.4–3.5. In the case of PETH, the K rises from about 3.56 at 25° C. to about 3.7 at 150° C.

Therefore to obtain a more uniform capacitance over a broad temperature range a combination of dielectrics such as PETH and PI or others may be used such as a film of each of equal thickness or of unequal thickness to achieve certain desired electrical characteristics. Since the dielectric strengths of both materials are about equal and they are of about the same dielectric constant, this should be feasible, not only to obtain a more uniform capacitance over the temperature range up to about 125°–150° C. but also they compensate for anamolous characteristics of each other in other respects.

In laminated capacitor tests with PI film where the objective was to make units which would safely operate at 10,000 v., there was not a substantial increase in breakdown voltage in going from 0.002 inch film to 0.003 inch film. This is consistent with the general rule that dielectric strength is much greater on thin films than on thick films on a per mil basis. In view of this it should be preferable from the dielectric withstand voltage standpoint to use multiple films. The use of multiple thin films may be of the same material such as PETH or PI or others. The multiple thin films should be bonded together throughout or bonded together at the outer edges of the dielectric.

In addition to PETH and PI films as dielectric there are other film dielectrics which may be applicable, however their dielectric strengths are somewhat lower. The following are also applicable for some uses in that they can be bonded to the electrode foils by applicable bonding materials. These would include: (1) polysulfone, (2) polycarbonate, etc.

Still a third group of film dielectric materials having moderate to good dielectric strength and having otherwise good electrical properties are preferred for some applications. Some of these are low cost films. However, they are not very amenable to bonding to the electrode foils by the applicable bonding agents. This would include: (1) polystyrene, (2) polyethylene, (3) polypropylene, (4) polyvinylfluoride, (5) polytetrafluorethylene, etc.

As to applicable bonding agents to bond the dielectric film to the foil electrodes and to fill in between the edges of the dielectric and cover or embed the inset foil edges, a wide variety of materials are applicable. The following characteristics of the bonding agents are desirable. (1) Fill substantially all void spaces between the film dielectric and the electrode foils to avoid corona discharge at the higher voltages, (2) to provide for a structurally rigid device to better withstand severe environmental conditions and (3) to afford means for strong lead attachment in a manner which does not impair the operating voltage capability but which does provide for a noninductive capacitor device even through the structure may be made by winding the electrode foil and film dielectric members together, concentrically, which usually, by the prior art methods, results in a capacitor having various degrees of inductance.

Preferably, the bonding agent should have most or all of the following characteristics:

a. good dielectric strength, but not necessarily high,
b. good adhesion or bonding property to the dielectric film and to the metal foil electrodes,
c. moderate to high temperature capability, 100° C. to 250° C.,
d. not liberate substantial amounts of water or volatile gases during processing or curing,
e. have sufficiently good rheological properties that under moderate mechanical pressure and heat it will be sufficiently removed from between the dielectric film and the electrode foil that the resulting electrical properties of the dielectric will not be appreciably affected adversely,
f. should have sufficiently low viscosity and long pot life that wound structures can be vacuum impregnated to fill in spaces between the dielectric film and electrode foil at least part way into the structure in order to provide rigidity to the foil and film edges and cover and fill in the void area left by the opposite inset foil, and to prevent arcing or corona between the foil edges,
g. upon curing or setting to a solid, the bonding agent must not be too brittle otherwise the structure may form cracks resulting from mechanical and thermal shock.
h. lends itself to application to either the foil or film or both while in a flowable or liquid condition to the desired thickness, then converted to a low fusing solid film, or "B" stage, which can later respond to mechanical pressure and heat to force the excess material from between the dielectric films and electrode foils and said excess material filling in voids areas or spaces particularly about the electrode and film edges.

Among the types of or specific materials which are known to have adhesive bonding properties to metal foil electrodes and many dielectric film materials and have a degree of physical and electrical integrity, the following terms emphasize the active polymeric ingredients:

1. Epoxy resins,
2. Polysiloxane coating and potting resins.
3. Vinyl polymers.
4. Polyurethane adhesives.
5. Polyimide.
6. Polysulfones.
7. Polybenzimidazole.
8. Polyphenylene sulfide.
9. Various cellulosic compounds.
10. Epoxy-nylons adhesives.
11. Epoxy-phenolics adhesives.
12. Epoxy-polyamides.
13. Rubber-phenolics.
14. Vinyl-phenolics.

It will be apparent that many of the previously described film materials may also be used as linking agents, if applied to the foils and/or films to be bonded while still in the monomeric and semipolymeric stage.

The list of applicable materials is by way of example, only and it is obvious that new materials are under current development and new ones will be produced in the future. Perhaps virtually all of the bonding materials listed above are applicable where the requirements of operating temperature, voltage, and other electrical characteristics are not severe. However, for high voltage operation, such as 500 volts to upwards of 25,000 volts, otherwise good electrical properties, broad operating temperature range etc., the choice of bonding agent would necessarily be limited to a fewer number of materials. As examples, two quite useful material groups, the polysiloxanes and the epoxies are treated in some detail to convey their versatile nature.

Polysiloxanes are very suitable to use as adhesive bonding agents. They are commercially available as liquids, solids, gels and solutions of solid or semisolid resins. Their preparation and use have been the subject of much patent and other literature, as has their curing agents and processes. One common method of preparation consists of condensing together one or more hydrolyzable silane monomers to give a structure simply and generally depicted below,

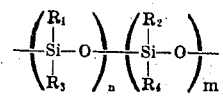

where the R-groups may be varied very widely by proper selection of the silane monomers, e.g., 1. alkyl groups, straight chain or branched, particularly the lower alkyls
2. alkenyl groups; e.g., vinyl or allyl, etc.
3. aryls, aralkyl or alkaryl groups; e.g., phenyl, tolyl, benzyl, biphenyl, etc.
4. substituted alkyl; such as halides, hydroxyl, ethers, carboxyl, esters, cyano, nitro, sulfate and the like, e.g., $-CH_2CH_2Cl, -CH_2CH_2CH_2CN, -CH_2CH_2CF_3$, etc.
5. substituted aryl; such as halides, hydroxyl, ethers, carboxyl, esters, cyano, nitro, sulfate and the like, e.g., $-C_6H_4F$, $-C_6H_4{}^{OCH}{}_3, C_6H_3Cl\ NO_3$, etc.
6. silane hydrogen; i.e., $-H$
7. hydroxyl groups; i.e., $-OH$
8. ether group—$OR$ where R is e.g., alkyl A balance of variably predictable properties is obtained by varying these R-groups according to known procedures. The groups in 1), 2) and 3) are essentially nonpolar and result in polymers having low dielectric constants ($K=2-3$, e.g.) and low loss factors ($DF=<0.001$, e.g.). Hence, they do not contribute markedly to any special or abnormal electrical effects, but they may be varied to give different handling characteristics in the fusible state, and physical properties in the cured state.

Of particular suitability to use in this application are the polysiloxanes commercially available as coating and/or laminating resins. In these, some silanol groups are present on the chain, which may be represented very generally by,

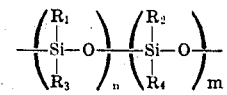

the R-groups being chosen from 1) through 6) above. The average length of the chain ($n+m$), the degree of branching, and the hydroxyl content of the polymer are determined by the composition of the monomeric silane mix in the initial condensation, and by the after treatment given the condensate, as is well known to those skilled in the art.

In the state usually supplied, these polysiloxane resins are soluble and fusible. They may be cross-linked by heating, with or without a catalyst to speed up the reaction, into an insoluble, infusible and adherent resin mass.

The ratio of R group to Si atoms (R/Si) is used to describe in a very average manner, the degree of branching of the polymer and the hydroxyl content, both generally being higher as the R/Si decreases. Suitable R/Si ratios run from 1 to under 3. Preferred resins have a R/Si ratio of about 1.3 to about 1.9, and the preferred R groups are combinations of methyl and phenyl with a phenyl/methyl ratio of 0.1 to 0.9. A resin found to be very suitable has an R/Si of about 1.4 and a phenyl/methyl of about 0.3. The fully cured resins have excellent electrical and thermal properties, and are especially valuable for use as bonding agents between electrode foil and film dielectric.

In addition to the above many polymers are modified with siloxane resins or compounds to lend increased moisture resistance and, often, increased temperatures capability. This is usually accomplished by reacting a functional group on the polymer chain, e.g., hydroxyl, with a reactive group on the siloxane, e.g.,

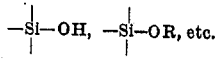

Thus, there are available, for example, siloxane-epoxy resins, siloxane-alkyls, siloxane-phenolics and the like, the enhanced properties of which may render the base polymer more readily usable as a bonding resin.

One very important type of resin is the silicone potting and encapsulating resins. In one reaction the addition of silane hydrogen on one chain to a vinyl group on another, e.g.,

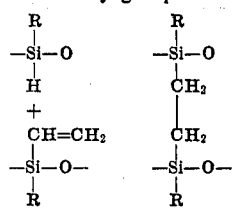

All of the epoxy resin systems available today are useful adhesive bonding agents to a greater or lesser degree. They are usually discussed in terms of 1) the resin and combinations thereof, 2) the hardeners or catalysts, 3) activators which may promote the resin-hardener reaction, and 4) modifiers which change the electrical and/or physical properties of the cured system.

Some of the more common resins, thoroughly discussed in patent and other literature, are
1. diglycidyl ethers of Bisphenol A (DGEBA);
2. polyglycidyl ethers of phenolic resins (PGEPR);
3. various compounds usually termed cycloaliphatic oxirane resins, e.g., vinyl cyclohexanediepoxide (VCHDE) and bis (3, 4-epoxy-6-methyl cyclohexylmethyl) adipate (BEMCA);
4. epoxidized unsaturated polymers, e.g., epoxidized butadiene-styrene copolymers (EBSCP);
5. epoxidized natural products, e.g., epoxidized soybean oil (ESBO). They are all characterized by having more than one oxirane rings

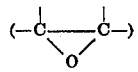

present. Simplified representative structures are given below:

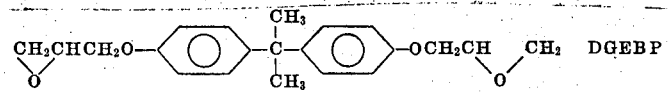  DGEBP

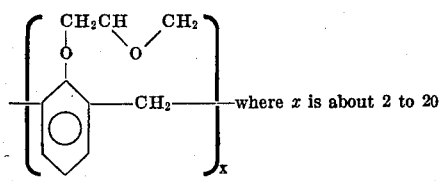 where x is about 2 to 20    PGEPR

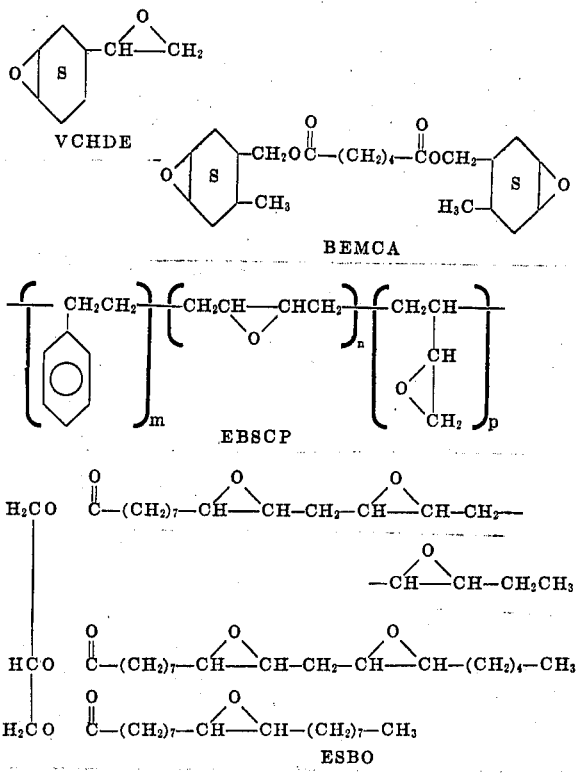

With regard to the radicals, i.e., R, R', $R_1$, $R_2$, $R_3$, and $R_4$ groups defined in this application, the aliphatic, cycloaliphatic alkyl, alkenyl, aryl, aralkyl, alkaryl, aromatic, substituted alkyl, substituted aryl, substituted alkaryl, substituted aralkyl, groups preferably contain not more than about 20 carbon atoms, more preferably not more than about 12 carbon atoms, most preferred not more than about eight carbon atoms. Further, the aliphatic, alkyl, alkenyl, and substituted alkyl groups most preferably contain not more than about six carbon atoms.

Epoxy resins react to give cured systems with most compounds containing a plurality of active hydrogen groups, such as amines, carboxyls, carbinols, phenols, mercaptans, and the like. They become chemically bound into the cross-linked resin structure. Of the more common hardeners, mention should be made of:
1. amines, both aliphatic and aromatic, e.g., the aliphatic series ethylene diamine through tetraethylene pentamine; aromatic amines such as metaphenylene diamine and methylenedianiline.
2. anhydrides, e.g., phthalic-, maleic-, and methyl-3, 6-endomethylene-tetrahydrophthalic anhydride; pyromellitic-, cyclopentane- and benzophenone-dianhydrides; dodecenylsuccinic anhydride, polyazeleic-polyanhydride, and the like;
3. flexibilizing hardeners, such as polyamides (Versamids), polysulfides (Thiokols), dimer and trimer acids, the last two anhydrides mentioned above, and the like.

In general, hardeners are used at or near the stoichiometric ratio of active hydrogen to oxirane ring. Epoxy catalysts are usually differentiated from the hardeners given above, in that the catalysts promote the epoxide-epoxide reaction without necessarily entering the polymer chain themselves; and are used in lesser amounts, e.g., perhaps 0.1-5 percent by weight. The more common are Lewis acids and bases, and adducts thereof, e.g., borontrifluoride and its monoethylamine adduct, and tertiary amines such as piperidine and 2, 4, 6-tris(dimethylolamino) phenol. These catalysts often provide latent curing systems; e.g., stable at room temperature, but active hot.

Activators may be used to promote the reaction between the epoxy resin and the hardener, most commonly to speed the reaction between glycidyl epoxy groups and anhydrides. Lewis bases, such as those mentioned above or benzyldimethyl amine, are commonly used. Phenolic moieties often enhance the somewhat sluggish reaction between aromatic amines and epoxy resins. The amino hydrogens on the aliphatic amines are generally very reactive to glycidyl epoxy groups, even at room temperature, and require no activator. In fact, their reaction is often purposely retarded, by employing them as an adduct of the epoxy resin or as the salt of a weak acid, such as cyclohexanecarboxylic, in order to obtain a reasonable pot life.

Not only the properties required in the capacitor dictate or indicate the bonding agent to be employed but also the physical construction of the capacitor will influence the choice of material. As an example, a small stacked foil and film unit may best employ certain types of bonding materials while a wound construction may best employ certain other types. The capacitor size also is a factor in the choice of material.

The various bonding materials also have different physical properties before incorporating in the device, therefore they require different methods or techniques in their use. The following describes the various physical forms and how these relate to the methods by which they may be used in the construction of capacitors to achieve the desired results to be expected from these agents.

1. Solids dissolved in a solvent. In this category would be included both thermoplastic and thermosetting bonding materials. In general, solutions of the materials would be applied to either the electrode foil or the dielectric film or both, then the solvent evaporated to leave a sufficient thickness of the coating on the member to later serve as the bonding agent after assembly into a stacked or wound capacitor structure then subjected to mechanical pressure and heat. With either thermoplastic or thermosetting materials, solvent removal must be rather complete to preclude its volitilization during the application of heat and pressure causing voids in the structure. In the case of thermosetting resins and materials the solvent removal must be at sufficiently low temperature that the material will not be converted to the cured or infusible condition.

Examples of thermoplastic materials in this category are as follows:

a. Polyphenylenesulfide, a high temperature material melting at about 290° C. PPS is extremely limited in solubility, the best solvent being trichlorobiphenyl maintained at 200° C. or higher. The electrode or film member is coated with the PPS by dipping in the hot solution and withdrawing with subsequent heating in air to about 300° C. to 340° C. to volatilize away the chlorinated biphenyl at which temperature the PPS fuses to give a thin coating. Coating thickness can be increased by repeating the operation several times since the previously applied fused coatings are no longer soluble in the solvent. Although this is a very good bonding agent in many respects its use is limited to the very high-temperature film dielectric materials such as polyimide and polyamideimide which are infusible and thus will withstand the temperature required to fuse the polyphenylenesulfide. Examples of other high temperature thermoplastic bonding would be b. Polysulfones which are soluble in a number of solvents such as N-methyl-pyrrolidone, m-cresol N, N-dimethylacetamide, dimethyl sulfoxide etc., and c. Polyethylene terephthalate which is soluble in m-cresol, trifluoroacetic acid, o-chlorophenol etc. Due to their high fusion points, about 300° C., these materials are also limited in their use to high temperature film dielectrics such as polyimide.

Examples of low fusion temperature thermoplastics would include d. Cellulose nitrate,
e. Cellulose acetate,
f. Cellulose acetate butyrate,
g. Ethyl cellulose,
h. Vinyl chloride,
i. Vinyl acetate,
j. Polyisobutylene, etc.

All these materials are soluble in common organic solvents from which they can be applied to foil or films, then dried resulting in coatings which are fusible under the agencies of heat and mechanical pressure.

Examples of thermosetting materials which can be applied to foil electrodes or film dielectrics from their solutions would include:

a. Addition type polyimide for example in dimethylformamide. This type of polyimide releases virtually no gaseous reaction products during curing in contrast to the usual condensation type polyimide which releases much water vapor during curing resulting in severe void formation. In use, the addition type material is applied to the foil or film then subjected to an initial temperature of 150° C.-200° C. for 3-6 minutes to remove the solvent, then to 200° C. to 260° C. for 3-6 minutes to imidize the material. In this form it is a fusible solid coating which responds to fusion and flow under mechanical pressure and heat at a temperature of 300°C. to 350° C. Due to this high temperature the material can only be used with very high temperature film dielectrics such as polyimide and polyamide-imide. Its use however makes possible an all-polyimide construction which is useful at operating temperatures as high as 300° C. since polyimide has outstanding thermal and electrical properties.

b. Other applicable thermosetting type materials are the siloxane coating resins. These may be applied from toluol solutions and the solvent removed by heating at 70° C. to 80° C. for about 10-25 minutes. This results in a fusible coating which can be cured or polymerized under mechanical pressure and heat of 150° C.-200° C. for periods of 1½ to 15 hours. These resins represent intermediate temperature cures and thereby permits their use with other films in addition to the polyimide. These would include the polysulfones, polyethylene terephthalate, polycarbonate, etc. Other thermosetting bonding agents in this category but having lower processing temperatures and lower operating or use temperatures would include the following (c) Polyurethanes,
(d) Epoxy-nylons,
(e) Epoxy-phenolics,
(f) Rubber-phenolics,
(g) Vinyl-phenolics,
(h) Epoxy-polyamides.

All of these materials are soluble in aromatic solvents such as benzol, toluol, xylol, etc., from which coatings can be produced. These solvents may affect certain dielectric films however in such cases this can be avoided by applying the material to the electrode foil.

2. Fusible tape: Of considerable applicability, are certain fusible films specially produced for the bonding of metal to metal and metal to other materials. These tapes are based on thermosetting materials and therefore are infusible after curing and thus offer moderately high use temperatures. Another attribute is the absence of solvents and some do not emit gaseous products during the curing operation. Although these tapes can be used in wound capacitor constructions by winding in one of these members between each foil and dielectric film followed by pressing the winding between heated platens to fuse the bonding film to cause it to bond the dielectric film and foil together and to force out excess material, they are perhaps better indicated for use in stacked or laminated constructions of small size. Here the bonding tape would be precut to the proper size and a piece used in the layup between each electrode foil and dielectric film. Pressing between heated platen causes the bonding tape to fuse and bond the dielectric film and foil together and to force out excess material to fill in between the edges of the films and to cover the edges of the electrodes.

One material available in tape form is based on a combination of elastomer and phenolic. Tensile shear strength of 2,500 p.s.i. can be obtained with a cure time as low as 2–3 minutes using a curing temperature of 200° C.–225 C. Such rapid cure rates restricts this material to relatively thin laminations and small windings in which the heat permeate the structure quickly. The elastomer-phenolics have the shortcoming of giving off some volatile byproducts during cure thus leaving slight void spaces and thereby restricting their use.

Another type bonding material is elastomer-resin. This is superior to the elastomer-phenolic in that tensile shear strength of as much as about 5,000 p.s.i. is obtained, and no volatile byproducts are given off during cure. Additional advantages are higher service temperatures, about 125° C., and lower pressures required, 50 p.s.i. to 200 p.s.i. to produce the bond. Although cure time is longer, about 60 minutes at 175° C., cure can be effected in as short as 30 seconds at higher temperatures. The longer cure time of this material enables its use in larger structures than is possible with the elastomer-phenolic because of its superior rheological properties, remaining at lower viscosity for a longer period of time to enable the excess material to be forced out from between the dielectric film and the foil.

These materials can be used with such dielectric film as polyimide, polyethylene terephthalate, polysulfone, polycarbonate and others if they are not adversely affected by the required curing temperatures.

3. Solventless liquid bonding agents.

In this category are certain materials which are highly useful as bonding agents. They differ from the previous materials mainly in that they are liquids but they contain substantially no volatile solvent. They are incorporated into capacitor constructions in their liquid condition without diluting with a solvent. As a group they convert to solids by use of curing agents with or without the application of heat. Another characteristic is that they do not liberate substantial amounts of gaseous byproducts during cure. Although these materials, as a group, contain no solvents many have sufficiently low viscosity that they have sufficiently good rheological behavior that only modest mechanical pressure need be applied to remove excess material from between the capacitor elements of either stacked or wound construction even in relatively large sections.

The use of these materials in the assembly of capacitors requires somewhat different techniques than the previously mentioned materials, primarily because they are liquids.

In making small stacked units starting with precut foil electrodes and dielectric film, one or both are coated with the liquid by various means such as dipping, roller coating, doctor blade coating etc., then laid in place in the proper relationship to each other, then mechanically pressed between heated platens or in a fixture to remove the excess bonding material and by application of heat the residual material cures and bonds the elements together.

In making wound units the preferred method is to employ the so-called "wet" winding process similar to that commonly used in making certain types of electrolytic capacitors. In the practice of this method the dielectric films or electrode foils or both are pulled through a small container of the liquid resin material as the units are wound. Upon emerging, the members are brought between doctor blade scrapers or elastomeric rolls adjusted to leave the proper amount of material on the members. By a similar process the film or foil or both may be allowed to contact transfer rolls which have a film of the liquid resin material on the surface, thus sufficient material is transferred to the foil or film. By either of these or other methods, the resulting wound unit contains sufficient liquid material between the members that upon pressing between heated platens the excess is forced out from between the foil and film to fill in between the adjacent film edges and to cover the edges of the inset foil electrodes. This operation also converts the liquid to a solid which is bonded to the capacitor elements and to occupy substantially all void spaces within the structure.

Since the materials in this category contain no solvents and practically no volatile materials they are adaptable to vacuum impregnation of dry wound units. This is feasible also because they are relatively low in viscosity. Although some compositions have viscosities ranging up to over 25,000 centipoises, the range for the low viscosity compositions is about 3,000–6,500 centipoises. Although vacuum impregnation of wound units is not likely to be as thorough as by wet winding, it does offer some advantages, particularly in that dry winding of units is more rapid. After vacuum impregnation, the units are drained then pressed between heated platens as described previously.

These liquid resins are generally two-part systems, having a hardening or curing agent present during use, consequently they generally have a limited "pot life." Nevertheless, by the proper choice of curing agent or hardening agent and by use at slightly reduced temperature it is possible to extend the pot life to as long as 8–48 hours.

a. Solventless silicone potting and encapsulating resins.

These materials have very good electrical and thermal properties. They are quite adaptable to this application by virtue of having the above properties along with good rheological characteristics.

They are, however, somewhat lacking in rigidity in the cured condition which sometimes may limit their use to certain types of constructions, particularly to small windings where slight flexibility can be tolerated and a high bond strength is not necessary.

Although similar products are available from various manufacturers, one specific example representative of this group is Sylgard 182, a siloxane resin product of the Dow Corning Corp. Although higher viscosity grades are available, this one has a relatively low viscosity of 4,000–6,500 centipoises at room temperature. This material cures for example in 4 hours at 65° C., 1 hour at 100° C. or 15 minutes at 150° C.

b. Epoxy Resins. Although not having the best properties in all respects, epoxy resins are one of the preferred materials for the practice of this invention. The broad range of compositions available provides for a high degree of versatility in their use. In addition to high bond strength and good electrical properties, compositions are available which have relatively low viscosities, in the range of about 3,000–5,000 centipoises, and moderately high operating temperatures such as 150° C. and higher. Furthermore, they are versatile with respect to pot life and curing temperature and times.

EXAMPLE I

Voltage breakdown tests were made on four as-wound capacitors of approximately 0.02 uF rating and measuring about 1 inch long × 11/32 inch diameter. These were wound with two layers of 0.0005 inch thick polyimide film between 0.0025 inch aluminum foil electrodes. One edge of each foil extended out of one end of the winding while the other edge was positioned 1/8 inch –3/16 inch below the edges of the dielectric film at the opposite end to provide ample distance between the foil edges on each end. These units had breakdown voltages as follows:

1. 3,500 volts DC
2. 3,000 volts DC
3. 3,700 volts DC
4. 3,500 volts DC

Breakdown occurred at the foil edges of all units.

Eight capacitors identical to the above except the foil extensions were cut off then the units were vacuum impregnated in a low viscosity epoxy resin (4,000–6,000 centipoises) for 1 ¾ hours at room temperature. Resin composition was:
- 300 grams Diglycidyl ether of Bisphenol A
- 264 grams Anhydride curing agents
- 6 grams Amine activator After impregnation the resin was cured for 2 ¾ hours at 150° C. then the excess hardened resin was removed from both ends to expose one edge of the opposite foil electrodes to which electrical contacts were made. Breakdown results were as follows:

1. 6,000 VDC
2. 6,500 VDC
3. 8,000 VDC
4. 9,000 VDC
5. 5,000 VDC
6. 6,000 VDC
7. 8,000 VDC
8. 8,000 VDC

These values are substantially higher than those of the unimpregnated units and are in the range of the breakdown values expected of the film dielectric. There was no indication of breakdown at the foil edges.

Some of these units were sectioned and found to be rigid throughout showing excellent resin penetration.

EXAMPLE II

Three capacitor windings identical to those in Example 1 above were first measured for capacitance and D.F. then vacuum impregnated in the same epoxy resin composition for 45 minutes, then removed and pressed individually between heated platens for about 1½ hours at 550 lbs. during which the temperature was raised to about 175° C. to cure the resin. After removal from the press the excess hardened resin was removed from each end to expose the edges of electrode foils for electrical contact for measurement. One object of this test was to determine the effect of this treatment on capacitance and breakdown voltage.

INITIAL MEASUREMENTS

|   | Capacitance (µf.) | Dissipation Factor (%) |
|---|---|---|
| 1. | 0.02100 | 0.157 |
| 2. | 0.02087 | 0.165 |
| 3. | 0.02122 | 0.157 |

MEASUREMENTS AFTER PRESS-CURING

|   | C | % C Change | D.F. % | BD Volts |
|---|---|---|---|---|
| 1. | 0.02234 | +6.4 | 0.155 | 7,500 |
| 2. | 0.02222 | +6.4 | 0.158 | 7,000 |
| 3. | 0.02221 | +4.7 | 0.165 | 5,000 |

These results show a substantial improvement in breakdown voltage over the unimpregnated units in Example I. Also an actual increase in capacitance is experienced.

EXAMPLE III

This example is presented as definite evidence that capacitance is not decreased as a result of inclusion of bonding material between the dielectric film and the foil electrodes. In this test two simple three-plate stacked capacitors were made by positioning two nickel foil electrodes 0.001 inch thick by 1.25 inch square side by side about ½ inch apart. Over and under these were positioned two long nickel foils, 0.001 inch thick × ⅝ inch wide × 4 inch long. Connected together at one end these became common electrodes for both capacitor assemblies. Dielectric films of 0.003 inch polymide film separated all the foils. With insulating film on either side of the assembly it was placed between platens to which incremental pressure increases were made by an air press with capacitance measurements made at each pressure at room temperature. The crossed plate area of each capacitance was about ¾ sq. inch and the pressures reported below are in pounds per square inch.

| Pressure (p.s.i.) | Capacitance of No. 1 (picofarads) | Capacitance of No. 2 (picofarads) |
|---|---|---|
| 66 | 581 | — |
| 132 | 586 | 583 |
| 198 | 590 | 588 |
| 330 | 597 | 595 |
| 396 | 599 | 597 |

This shows that in pressing the dry assemblies capacitance increase with pressure is only minute above 330 p.s.i.

The assembly was dismantled and all members coated with epoxy resin of the combination reported in Example I and the various members replaced in their previous position and returned to the press. Measurements of capacitance at increasing pressure increments were again made.

| Pressure (p.s.i.) | Capacitance of No. 1 (picofarads) | Capacitance of No. 2 (picofarads) |
|---|---|---|
| 33 | 520 | 518 |
| 132 | 631 | 630 |
| 198 | 634 | 633 |
| 264 | 636 | 634 |
| 330 | 637 | 635 |
| 396 | 639 | 636 |

These results show that practically all excess resin is removed from between the foils and films at 132 p.s.i. and some increase in capacitance is obtained when this bonding agent is used over that of the dry pressed assemblies.

EXAMPLE IV

The same test was made as in Example III except a liquid silicone casting and potting resin (Dow Corning Corp. Sylgard 182) was used.

Capacitance measurements at various pressures (dry)

| Pressure (p.s.i.) | Capacitance of No. 1 (picofarads) | Capacitance of No. 2 (picofarads) |
|---|---|---|
| 33 | 440 | 442 |
| 66 | 458 | 460 |
| 132 | 571 | 573 |
| 264 | 578 | 580 |
| 396 | 583 | 584 |

Capacitance measurements at various pressures with silicone between all foils and films

| Pressure (p.s.i.) | Capacitance of No. 1 (picofarads) | Capacitance of No. 2 (picofarads) |
|---|---|---|
| 66 | 573 | 586 |
| 132 | 591 | 593 |
| 198 | 598 | 600 |
| 264 | 604 | 604 |
| 396 | 607 | 608 |

These results also show an increase in capacitance with the silicone bonding agent over that of the dry pressed assembly.

I claim:

1. A capacitor comprising:
   at least one first metal electrode;
   at least one second metal electrode;
   at least two substantially aligned discrete polymeric films bonded to said first and second electrodes by means of at least one adhesive bonding agent which provides structural rigidity to the capacitor;
   said first electrode emerging from between adjacent polymeric films and extending at least to the edges of said films on at least a first side;
   said first electrode being inset with respect to the edges of said polymeric films on at least a second side;
   said second electrode emerging from between adjacent polymeric films and extending at least to the edges of said films on said second side;
   said second electrode being inset with respect to the edges of said polymeric films on at least said first side;
   said adhesive bonding agent covering the inset edges of said first and second electrodes on all sides of the capacitor;

a first terminating coating of metallic material conductively bonded to the exposed portion of said first electrode at least on said first side;

a second terminating coating of metallic material conductively bonded to the exposed portion of said second electrode at least on said second side;

the combination of the discrete polymeric film and the adhesive bonding agent permitting the capacitor to withstand breakdown voltage of at least about 3,000 volts per mil between said first and second electrodes.

2. A capacitor according to claim 1 in which said film is made from a polymeric material selected from olefin polymers, condensation polymers, and polymers containing heterocyclic linkages.

3. A capacitor according to claim 1 in which said first and second electrodes are made of the same metal or alloy.

4. A capacitor according to claim 3 in which said first and second electrodes are made of aluminum or aluminum alloy.

5. A capacitor according to claim 2 in which the film is made of an olefin polymer selected from the group consisting of vinyl, vinylidine, acrylics, vinylene, aromatic and aromatic derivative type polymers and copolymers thereof.

6. A capacitor according to claim 2 in which the film is made of a condensation polymer selected from the group consisting of esters, polycarbonates, polyamides, polyurethanes, polymers based on heterocyclic linkages and combinations thereof.

7. A capacitor according to claim 1 in which said adhesive bonding agent is a polymeric adhesive bonding agent.

8. A capacitor according to claim 1 in which said bonding agent fills substantially all void spaces at least at the edges between said film and electrode foils.

9. A capacitor according to claim 7 in which said polymeric bonding agent is selected from the group consisting of dried solids, having been applied from a solution, fusible tape and solventless liquid bonding agents.

10. A capacitor according to claim 9 in which said dried solids having been applied from a solution is selected from thermoplastic and thermosetting materials.

11. A capacitor according to claim 6 in which said film is polyimide film.

12. A capacitor according to claim 7 in which said film is polyethylene terephthalate.

13. A capacitor according to claim 1 in which more than one polymeric films is utilized between said electrodes in the capacitor.

14. A capacitor according to claim 13 in which at least one of the films in said capacitor is polyimide.

15. A capacitor according to claim 13 in which at least one of said films is polyethylene terephthalate.

16. A capacitor according to claim 6 in which said polymeric film is made from a material selected from the group consisting of polysulfone, polybenzimidazole and polycarbonate.

17. A capacitor according to claim 5 in which said film is made from a polymer selected from the group consisting of polystyrene, polyethylene, polypropylene, polyvinylfluoride, polytetrafluorethylene.

18. A capacitor according to claim 13 in which the dielectric films have at least slightly higher insulation resistance than that of the bonding agent.

19. A capacitor according to claim 1 wherein said first and second electrodes are foils and wherein said foils and said polymeric film comprise a stacked assembly.

* * * * *